(12) United States Patent
Boehl et al.

(10) Patent No.: US 9,671,771 B2
(45) Date of Patent: Jun. 6, 2017

(54) TIMER MODULE AND METHOD FOR CHECKING AN OUTPUT SIGNAL

(75) Inventors: Eberhard Boehl, Reutlingen (DE); Ruben Bartholomae, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 1265 days.

(21) Appl. No.: 13/637,142

(22) PCT Filed: Mar. 16, 2011

(86) PCT No.: PCT/EP2011/053961
§ 371 (c)(1),
(2), (4) Date: Dec. 10, 2012

(87) PCT Pub. No.: WO2011/120801
PCT Pub. Date: Oct. 6, 2011

(65) Prior Publication Data
US 2013/0079897 A1    Mar. 28, 2013

(30) Foreign Application Priority Data

Mar. 31, 2010 (DE) .................. 10 2010 003 532

(51) Int. Cl.
*G05B 19/042* (2006.01)
*B60W 50/04* (2006.01)

(52) U.S. Cl.
CPC ........ *G05B 19/0425* (2013.01); *B60W 50/04* (2013.01); *G05B 2219/21166* (2013.01); *G05B 2219/25278* (2013.01)

(58) Field of Classification Search
CPC ............ G05B 19/0425; G05B 19/0423; G05B 19/0428; G05B 19/048;
(Continued)

(56) References Cited

U.S. PATENT DOCUMENTS

| 4,631,693 A | 12/1986 | Neri |
| 7,219,280 B2 * | 5/2007 | McNall .......... G01R 31/318572 714/726 |

(Continued)

FOREIGN PATENT DOCUMENTS

| CN | 101048751 | 10/2007 |
| DE | 40 24 287 | 2/1992 |

(Continued)

OTHER PUBLICATIONS

Stefan Mendel, et al., "Signal and Timing Analysis of a Phase-Domain All-Digital Phase-Locked Loop with Reference Retiming Mechanism", Mixed Design of Integrated Circuit & Systems, 2009, Mixdes-16$^{th}$ Circuit International Conference, IEEE, Piscataway, NJ, Jun. 25, 2009, p. 681-687.

(Continued)

*Primary Examiner* — Nathan L Laughlin
(74) *Attorney, Agent, or Firm* — Norton Rose Fulbright US LLP; Gerard Messina (57) ABSTRACT

A method for checking an output signal of a timer module is provided, the timer module having at least one output module, at least one input module, and at least one logic module. The output signal to be checked is read in into the timer module via an input module in addition to its output via an output module, and in the input module, signal characteristics to be checked are determined for the output signal to be checked. Furthermore, the signal characteristics to be checked are read by the logic module from the input module and the signal characteristics to be checked are compared in the logic module to the predefined values for the signal characteristics.

21 Claims, 3 Drawing Sheets

(58) Field of Classification Search
CPC ........... G05B 2219/21166; G05B 2219/25278; B60W 50/04; B60W 50/045
See application file for complete search history.

(56) References Cited

U.S. PATENT DOCUMENTS

| | | | | |
|---|---|---|---|---|
| 2004/0059440 | A1* | 3/2004 | Renner | G05B 19/0421 |
| | | | | 700/19 |
| 2007/0050123 | A1* | 3/2007 | Nishimura | F02D 41/009 |
| | | | | 701/103 |
| 2008/0090537 | A1* | 4/2008 | Sutardja | G06F 1/3203 |
| | | | | 455/232.1 |
| 2008/0112476 | A1* | 5/2008 | Vong | H04L 25/4904 |
| | | | | 375/224 |
| 2010/0195670 | A1* | 8/2010 | Schmitt | G06F 1/04 |
| | | | | 370/498 |
| 2012/0265535 | A1* | 10/2012 | Bryant-Rich | H04M 1/7255 |
| | | | | 704/270 |

FOREIGN PATENT DOCUMENTS

| | | |
|---|---|---|
| DE | 197 28 841 | 2/1999 |
| WO | WO 2004/040383 | 5/2004 |
| WO | WO 2009/040179 | 4/2009 |
| WO | WO 2009/120504 | 10/2009 |

OTHER PUBLICATIONS

International Search Report for PCT/EP2010/069586, dated Jul. 5, 2012.

* cited by examiner

TIMER MODULE AND METHOD FOR CHECKING AN OUTPUT SIGNAL

BACKGROUND OF THE INVENTION

1. Field of the Invention

The present invention relates to a timer module as well as a method for checking an output signal.

2. Description of the Related Art

For the activation of safety-critical applications, e.g., when activating actuators with the aid of a control unit in the automotive field, an output signal, or the signal characteristic of an output signal, must be monitored, under certain circumstances, with regard to the duration of a high or a low phase of the signal or a period of the signal, or with regard to other signal characteristics. Here, it is customary, for example, to monitor the signal characteristic for limiting values in the actuator itself when activating an actuator. For this purpose, additional hardware and software are necessary.

BRIEF SUMMARY OF THE INVENTION

The present invention makes it possible to efficiently, flexibly, and reliably check an output signal, or certain signal characteristics of the output signal, of a hardware data processing unit, in particular of a timer module of a control unit.

In comparison to known methods, hardware use and software use may be reduced by using resources which are already present in the hardware data processing unit. By using flexible modules, a flexible adaptation of the check (e.g., boundaries of the check or type of the check) to the particular application is possible. Moreover, the proposed check method and the proposed check device also make it possible to comply with very high safety standards.

One particularly flexible adaptation of the check to the particular application is possible when the predefined comparison values in the logic module do not represent unchangeable values but values which are freely configurable by the logic module and/or an external CPU or arithmetic unit.

In one particularly advantageous embodiment, the routing unit of the hardware data processing unit reads the signal characteristics determined in the input module of the hardware data processing unit, by a comparison of these signal characteristics to the predefined values by the executing logic module of the hardware data processing unit. Such a routing function makes it possible to process these data in a particularly efficient and flexible manner and thus check them.

For the comparison between these signal characteristics and the predefined values by the logic module of the hardware data processing unit, it is advantageous when the signal characteristics are stored in the hardware data processing unit, in particular in the logic module, since this is implementable particularly simply and reliably.

In the case of an unsuccessful comparison, it is particularly advantageous to provide measures, such as an error signal output and/or an interrupt of an arithmetic unit to which the hardware data processing unit is connected. In this way, troubleshooting or error correction may be initiated or also an error may be pointed out only at an appropriate location, thus possibly preventing consequences of the signal error, for example, in the control by a control unit.

Additionally, an activity signal may also be output in one advantageous embodiment for a/every comparison outcome, i.e., for example, also regardless of success or failure of the comparison. In this way, the successful comparison outcome may be determined and documented and thus conclusions may be drawn regarding the modules and parameters involved in the comparison, in particular regarding their activity.

Particularly advantageously, the signal lengths of the output signal may be monitored in that the signal flanks of the output signal are assigned time stamp values in the input module, thus achieving an efficient and reliable check of this signal characteristic. Additionally, the difference between the time stamp values, in addition to possible comparisons against an admissible maximum value, may also be subsequently checked for whether the difference is greater than zero. Using this particularly efficient procedure, it is possible to also check the activity of the time base while checking the output signal. An inactive time base would namely result in two identical consecutive time stamps and thus to a difference of zero between the time stamp values.

It may also be provided that, in addition to the comparison using predefined values for the signal characteristics, a plausibility check is carried out, for example the described comparison, of whether a signal length is greater than zero. Thus, in addition to the prescribed errors, other errors to be detected by such a plausibility check may also be included in the monitoring.

DETAILED DESCRIPTION

A timer module of a control unit may preferably be implemented as an IP block in the microcontroller of a control unit, e.g., of a vehicle control unit. It combines the time and, if applicable, the trigonometric function, receives signals from the sensor system of the vehicle (e.g., yaw-rate sensor of an ESP), and evaluates them, and acts on the actuators of the car (e.g., on the vehicle dynamics in the "skidding" event). Alternatively, it would also be possible to integrate such a timer, as described in the following, into an output stage or provide it separately; however, it always needs a configurating unit (e.g., external arithmetic unit). In the case of its integration into the control unit microcontroller, this unit could be the or a control unit CPU (or arithmetic unit), for example.

Figure 1:
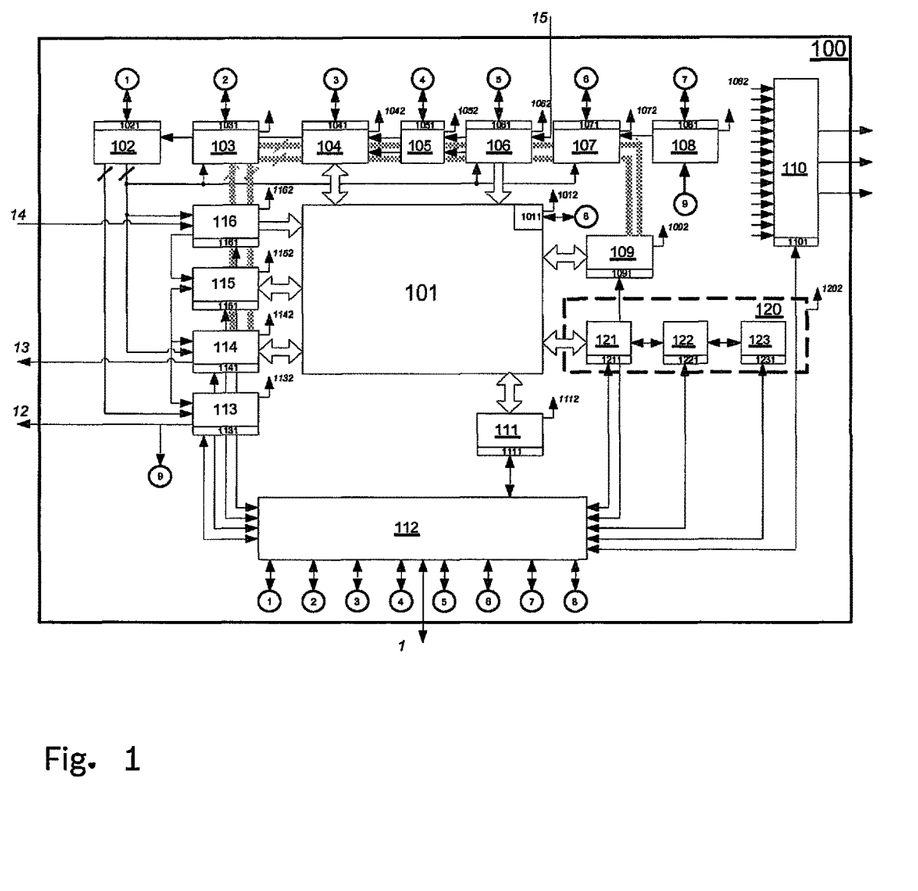
FIG. 1 shows a schematic configuration of a timer module.

FIG. 1 shows the overall configuration of an exemplary timer module 100. In simplified terms, the overall configuration of the timer module has a signal input unit (signal input units) 116 which outputs values to a routing unit 101; these values are processed in other modules and the processed values are forwarded to output unit 114 via routing unit 101. A large number of requests may be managed within a short period of time in that the modules described in the following work in parallel. If certain modules are not needed, they may be turned off for power saving purposes (power consumption, temperature reduction).

The core of timer module 100 is central routing unit 101 to which input (e.g., module(s) 116), output (e.g., module(s) 114), processing (e.g., module 109), and memory units (e.g., module 120) are connected.

Routing unit 101 interconnects the modules flexibly and configurably and represents, due to the blocking requesting and transmitting of data, a new interrupt concept for a timer module. It can be installed without the implementation of an interrupt controller, resulting in space and thus chip cost savings. A central concept of timer unit 100 is the routing mechanism of routing unit 101 for data streams. Each module (or submodule) of timer module 100, which is connected to routing unit 101, may have any number of routing unit write channels (data sources) and any number of routing unit read channels (data sinks). The concept of routing unit 101 provides that any data source may be connected flexibly and efficiently to any data sink. This may be implemented using a data routing mechanism, such as the one described in unpublished DE 10200900189.

Parameter memory module 120 includes three subunits 121, 122, and 123. Subunit 121 represents the interface between FIFO (first in, first out) memory 122 and routing unit 101. Subunit 123 represents the data interface between the generic bus interfaces of the modules, or multiplex device 112 (see below), and FIFO 122. Parameter memory module 120 may be used as a data memory for incoming data characteristics or as a parameter memory for outgoing data. The data are stored in a memory, e.g., RAM, which is logically situated in FIFO subunit 122.

Timer input module 116 (preferably including multiple inputs) is responsible for filtering and receiving input signals of timer module 100. Different characteristics of the input signals may be measured within the channels of timer input module 116. For this purpose, the signals are linked to time information and other physical information in timer input module 116 and are used, after being processed and, if necessary, buffered, in output unit 114 to generate output signals. The physical information is, for example, the angle of an engine or also any other physical variable such as mass, temperature, level of a fluid, phase of an oscillation, a number of events (edges), or the period duration of a signal. Input characteristics may, for example, include the time stamp values of detected rising or falling input flanks combined with the new signal level or the number of the flanks since a channel release combined with the instantaneous time stamp or PWM signal lengths for an entire PWM period. The values which are assigned to an input signal, such as the value of the time base and the value of the angle base at the point in time of the input event, thus characterize the input signal and allow for calculations in other modules which are connected to routing unit 101 (e.g., module 109), and may then contact an output unit (output unit 114) in which output signals are generated as a function of the transmitted values in connection with the instantaneous time and/or angle base values.

For advanced data processing, the detected input characteristics of timer input module 116 may be routed to the other processing units of timer module 100 by routing unit 101.

The unit for clock pulse conditioning 102 is responsible for the clock pulse generation of the timers and of timer module 100. It makes available configurable clock pulses, and time base unit 103 having both time- and position-related timers provides a common time base for timer module 100, i.e., makes available instantaneous time and position information (e.g., angle).

The individual modules are supplied with clock pulses and time bases and exchange data via routing unit 101. With the aid of comparators locally present in the individual modules, the data are compared against the instantaneous time and/or position, and decisions made in the process are signaled, such as the switching of an output signal.

When the data are routed with the aid of routing unit 101, branching unit 111 makes the data of a source also available to multiple data sinks in one or different modules, since a blocking reading of the data is usually provided which permits only one-time reading of a piece of data from a source. Since every write address for the submodule channels of timer module 100, which are able to write to routing unit 101, may only be read by one single module, it is impossible to make a data stream available to different modules in parallel. This does not apply to sources which do not invalidate their data after the data was read by a receiver, as may be provided for DPLL module 104, for example. To solve this problem for regular modules, it allows branching unit 111 to duplicate the data streams multiple times. This submodule 111 makes input and output channels available. In order to clone an incoming data stream, the appropriate input channel may be mapped on one or more output channels.

DPLL (digital phase-locked loop) module 104 is used for frequency multiplication. Due to this module 104, it is possible to achieve greater accuracy of the position or the value information even in the case of applications having rapidly changing input frequencies. DPLL module 104 generates from position-related input signals impulses which allow a more detailed subdivision of the position information in time base unit 103. In this way, a meter may, for example, indicate a higher resolution of a rotation angle than is predefined by the input signals. Moreover, information regarding speed or rotational speed is available in DPLL module 104, and it is possible to make predictions as to when a predefined position will be reached, also taking into consideration a course over time (e.g., taking into consideration the inertia of the control module). The input signals for DPLL module 104 are guided via timer input module 106, filtered in an input mapping module 105, or are else combined in a sensor pattern evaluation module 115, e.g., in particular for the evaluation of electric motors.

Timer input module 106 is special compared to other timer input modules 116 in that it forwards the instantaneous filtering values, using which it filters the input signals, to input signal mapping module 105 and DPLL module 104 and that the filtering values are added to the time stamps of the filtered edge to obtain an actual edge time.

Sensor pattern evaluation module 115 may be used to evaluate the inputs of multiple Hall sensors and to assist, together with timer output module 113 (preferably including multiple outputs), the operation of brushless direct current machines. Additionally, sensor pattern evaluation module 115 may also be used, for example, to calculate the rotational speed of one or two electric machine(s).

With the aid of output comparison unit 108, output signals may be compared to one another bit by bit. It is devised for use in safety-relevant applications. The main idea here is to have the possibility of doubling the outputs to be able to compare them in this unit. If, for example, a simple EXOR (exclusive OR) function is used for this purpose, it might be necessary to secure the output characteristic of an entire cycle of the output modules to be compared. As shown in FIG. 1, output comparison unit 108 is connected to the connection between timer output module 113 and pin 12 via the connection indicated by reference numeral 9.

Monitor unit 107 is also devised for use in safety-relevant applications. The main idea here is to provide the possibility of monitoring jointly used circuits and resources. In this way, the activity of the clocks and the basic activity of routing unit 101 are monitored. Monitor unit 107 makes it possible for an external CPU (central processing unit) or an external arithmetic unit in general to monitor central signals for safety-critical applications in a simple manner.

In FIG. 1, the interrupt request lines of the modules are labeled with four-digit reference numerals having the ending "2" and the first three numerals are labeled corresponding to the module. Interrupt concentration module 110 is used to appropriately bundle interrupt request lines XXX2 of the individual submodules in interrupt groups and to then forward them to the external arithmetic unit.

All modules are configurable by an arithmetic unit via a bus interface (universal handshaking interface). Data are also exchangeable via this bus interface. This is used to configure the outputs for periodic sequences, for example, for the output module timer output module 113 which is not connected to the routing unit. Timer output module 113 offers independent channels to generate PWM (pulse width modulated) signals at each output pin, for example. Additionally, a pulse timer-modulated signal may be generated at an output of timer output module 113.

Timer output module 114 which is connected to routing unit 101 is capable of generating complex output signals without CPU interaction due to its connection to routing unit 101. Typically, output signal characteristics are made available via the connection to routing unit 101 by submodules connected to router unit 101, such as DPLL submodule 104, multi-channel sequencer module 109, or parameter memory module 120.

Multi-channel sequencer module 109 is a generic data processing module which is connected to routing unit 101. One of its main applications is to calculate complex output sequences which may depend on the time base values of time base unit 103 and which are processed in combination with module 114. Each submodule of time output module 114 which is connected to routing unit 101 includes output channels which are able to operate independently from one another in different configurable operating modes.

In FIG. 1, the microcontroller bus is labeled with reference numeral 11, and the different pins (or pin groups) are labeled with reference numerals 12 through 15.

The timer module is equipped with a generic bus interface which is adaptable in various ways to different SoC buses (SoC=system on a chip). The adaptation of the generic bus interface is typically achieved via a bridge module which translates the signals of the generic bus interface into the signals of the particular SoC bus. In FIG. 1, the generic bus interfaces of the modules are labeled with four-digit reference numerals having the ending "1" and the first three numerals are labeled corresponding to the module. Multiplex device 112 multiplexes the generic bus interfaces. In FIG. 1, the connections between generic bus interfaces XXX1 and multiplex device 112 are indicated with reference numerals 1 through 8.

Figure 2:
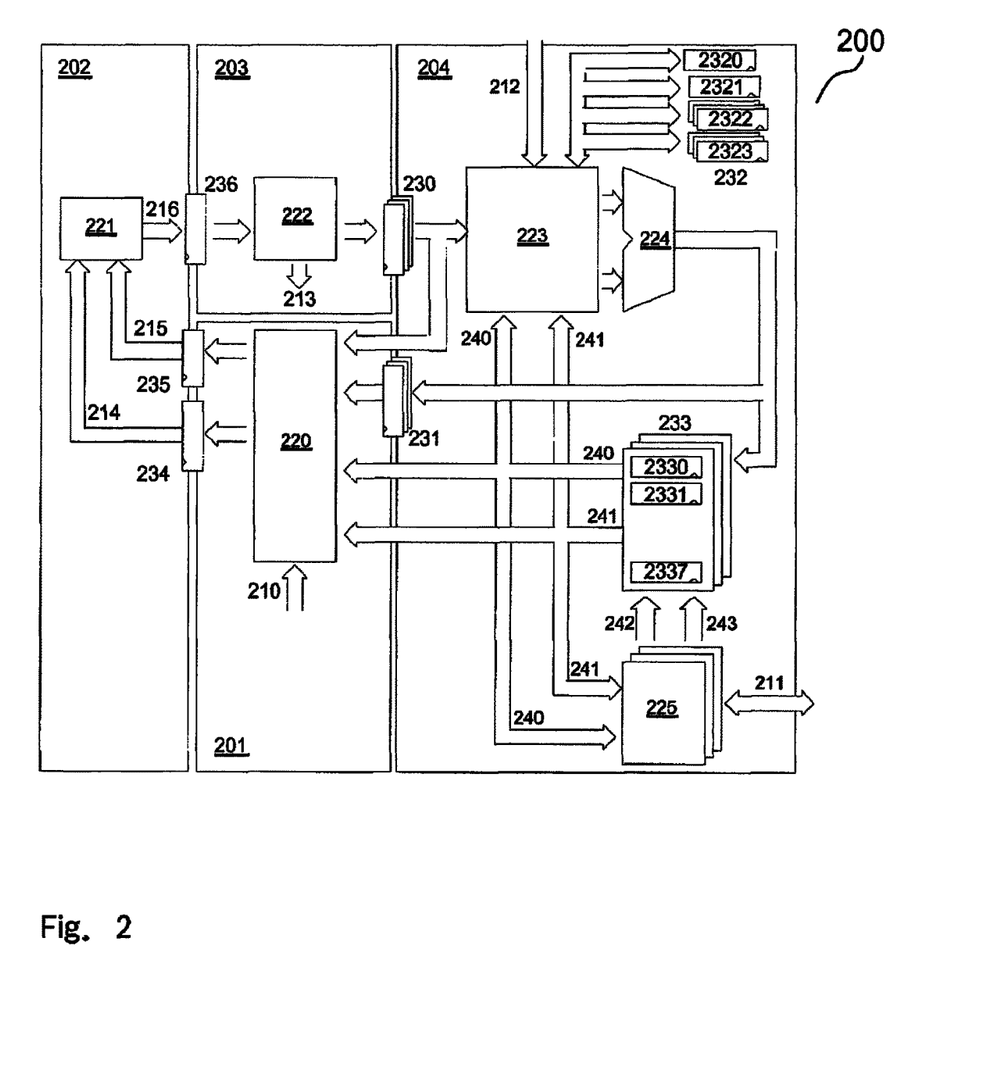
FIG. 2 shows a schematic configuration of a logic module of a timer module.

FIG. 2 shows multi-channel sequencer module 109 from FIG. 1 in one advantageous specific embodiment 200. Here, multi-channel sequencer module (MCS) 200 has the stages RAM access decoding 201, RAM access 202, instruction pre-decoding 203, and instruction execution 204. Stage RAM access decoding 201 includes RAM access encoder 220, stage RAM access 202 includes RAM memory 221, state instruction pre-decoding 203 includes instruction pre-decoder 222, and stage instruction execution 204 includes instruction pre-decoder 223, arithmetic logic unit (ALU) 224 as well as routing unit interface 225.

RAM access decoder 220 includes an input 210 for data or address information on the part of the external arithmetic unit as well as other inputs from stage instruction execution 204, as well as outputs to stage RAM access 202. Between stages 201 and 202, registers 234 and 235 are situated.

Register 234 is connected to an input of RAM 221 via RAM data input connection 214, and register 235 is connected to another input of RAM 221 via RAM address connection 215. RAM 221 is connected to register 236, which is situated between stages 202 and 203, via RAM data output connection 216.

Register 236 is connected to an input of instruction pre-decoder 222. Instruction pre-decoder 222 furthermore has a data output connection 213 in the direction of the external arithmetic unit and a connection to register 230, which is situated between stages 203 and 204.

Register 230 is connected to an input of instruction decoder 223 as well as to an input of RAM access decoder 220. An input of instruction decoder 223 is connected to a connection 212 on the side of time base unit 103 from FIG. 1. Also, instruction decoder 223 is connected to register block 232 or its individual registers 2320, 2321, 2322, and 2323. Two outputs of instruction decoder 223 are connected to two inputs of ALU 224. Also, instruction decoder 223 is connected to RAM access decoder 220, routing unit interface 225, and register block 233 via connections 240 and 241. Register block 233 includes registers 2330, 2331, ..., 2337. ALU 224 is connected to register 231 as well as to register block 233 via a connection. Register 231 is situated between stage 204 and stage 201 and is, in turn, connected to RAM access decoder 220. Routing unit interface 225 is connected to register block 233 via connections 242 and 243. Moreover, routing unit interface 225 has a connection 211 to routing unit 101 from FIG. 1.

In timer module 100, output signals may be generated in modules 113 and 114 as previously described. These signals may, for example, be pulse width modulated signals, or also other signals. The output signals of such a timer module 100 may, for example, be used to activate an actuator system, for example a valve in the automotive field, of an engine or a spark coil. Here, it may be significant, among other things, depending on the application, to not exceed or fall below certain activation times, and in general to not violate certain conditions for different signal characteristics. To ensure that, it may be provided or even required by standards, for example, to check the signals.

The signals which are generated in a hardware data processing unit, as in timer module 100 shown in FIG. 1, and are transmitted thereby may for this purpose be read in again and monitored by the hardware data processing unit itself, as will be described in greater detail in the following exemplary embodiments of the present invention. For this purpose, the output signal to be monitored is guided additionally from the output (in FIG. 1 a channel of output module 113 or 114, for example) back to an input (in the example of FIG. 1 to a channel of input module 116 which is specially provided therefor or reserved therefore during the configuration, for example). This may be implemented by an external connection/wiring, for example. Particularly advantageously, this is used for a timer module of a control unit, e.g., for use in the automotive field, where engine functions in a motor vehicle may be controlled by the control unit, for example, and the timer module assumes the necessary time and trigonometric functions. In its function, such an advantageous timer module outputs signals which must be subjected to a check, if necessary, and it also has the necessary means for carrying out the check itself as described above.

In a first exemplary embodiment concerning the check of an output signal with regard to its signal characteristic "signal length," every flank of the (output) signal to be monitored may be provided with a time stamp in input module 116, or in the channel of input module 116 which is specially provided or reserved therefor. This time stamp is generated by a time base being made available by time base unit 103 whose value is stored by input module 116 at the point in time of the incoming signal flank. Now, this time stamp may (as described in the following in greater detail) be forwarded via central routing unit 101 to multi-channel sequencer 109 and processed there. Multi-channel sequencer 109 (FIG. 1) or 200 (FIG. 2) is a logic unit (having logic subunits such as arithmetic logic unit (ALU) 224 or (pre-) decoders 220, 222, 223) which is configurable and programmable via its registers and RAM 221 (e.g., via the external arithmetic unit) and which is also able to perform computation operations and comparison operations. Multi-channel sequencer 109 executes a program which lies in RAM 221 and is stored there by the external arithmetic unit assigned to timer module 100. The check of a signal may be implemented in multi-channel sequencer 109 via the above-described time stamps assigned by input module 116, for example, having the following program sequence:

1. Blocking reading of the time stamp of the active (first) flank from input module 116 through multi-channel sequencer 109 via routing unit 101 to input 211 and storage in a first register of multi-channel sequencer 109, e.g., in a first register of register block 233. Blocking reading is understood to mean that multi-channel sequencer 109 makes a request to timer input module 116 with regard to the reading. This reading request is considered cyclically by routing unit 101, while timer input module 116 is polled as to whether a valid value, in this exemplary embodiment a valid time stamp, is available. Only if the value or the time stamp is available does the program sequence of multi-channel sequencer 109 continue. The multi-channel sequencer processes all other tasks regardless of whether or not the data for the observed channel (the relevant task) is available (multi-tasking).
2. Blocking reading of the time stamp of the passive (second) flank from input module 116 through multi-channel sequencer 109 via routing unit 101 and storage in a second register, e.g., in a second register of register block 233.
3. Difference formation between the second and the first registers and storage in a third register, in particular with the aid of ALU 224.
4. Check for whether the difference value in the third register exceeds the maximum value, in particular with the aid of ALU 224. If so, an error is signaled. The error is signaled via a special error signal, for example, to another module, for example, (in particular monitor unit 107) and/or by an error signal to the outside (i.e., to the outside of the timer module) and/or to the external arithmetic unit by triggering an interrupt. The possible error signal or interrupt request lines of multi-channel sequencer module 200 are not shown in FIG. 2, but they could originate from ALU 224, for example, which carries out the comparisons. The error signals or interrupts could consequently trigger error handling or correction routines or they could, for example, cause the control unit to which the timer module belongs to be switched into a safety mode. These various possible error signal mechanisms also apply to the remaining exemplary embodiments.
5. Check for whether the difference value in the third register falls below the minimum value. If so, an error is signaled. The error may be signaled as described in step 4.
6. Proceed to step 1.

With the aid of the illustrated program sequence, it is also possible in one advantageous embodiment to consider tolerances (e.g., for distortions on the signal path) by incorporating the tolerance value into the determination of the above-described maximum or minimum value. If (almost) no tolerance is to be allowed, the maximum value is to be selected to be (almost) equal to the minimum value.

In another exemplary embodiment, it is also possible to read back a transmitted PWM signal into timer input module 116 and to measure in timer input module 116 the PWM period and the duration of the high level as the signal characteristic (instead of the time stamp assignment as the signal characteristic). These two values, period and duration, are then forwarded via routing unit 101 in accordance with the above-described program sequence into multi-channel module 109 and are compared there to the predefined period and high values (e.g., again minimum and maximum values as described in the first example). Also, tolerances may again be added or subtracted prior to the comparison to a predefined value. If the comparison does not have the expected result, an error signal and/or an interrupt is/are generated again (see above).

In general, it is important for a reliable monitoring for signal characteristics, that jointly used signals, e.g., the clock pulse or time information of modules 102 and 103, are monitored as to whether they are still active, for example, and have not been subject to failure (e.g., the time base stops), since the inactivity of these jointly used signals would falsify the result of the described signal checks.

For the monitoring of these signals such as clock pulses or time bases, a GTM external watchdog module could, for example, be used which generates an error signal if a clock signal does not change within a certain time, for example. In a similar manner, the time base may also be monitored by monitoring with the aid of an external arithmetic unit, for example. This task may, for example, also be assumed by monitor module 107 shown in FIG. 1. For this purpose, the clock pulses may be monitored for activity in unit 107, and unit 107 may, in turn, be polled multiple times (regularly or irregularly) by the arithmetic unit. Even in the event of failure of routing unit 101, the above-described signal checks would not be able to take place. This is why it is also important to monitor the performance reliability of routing unit 101.

In one preferred embodiment of the exemplary embodiments described previously, it is possible in this context to trigger an interrupt for every errorless comparison and/or additionally to send a signal to monitor unit 107 for storage. The arithmetic unit receives this interrupt (if desired by the arithmetic unit, e.g., deactivatable if the interrupt load at the arithmetic unit is too great) and/or polls monitor unit 107 and thus learns that a comparison has taken place (at all) in an orderly manner. The external arithmetic unit may thus implicitly determine the performance reliability of the used input channels, e.g., of input module 116, of the routing via routing unit 101, and the activity of the used clock pulses or time base (modules 102 and 103). Overall, these measures thus correspond to the output of an activity signal when carrying out the comparison (regardless of its output).

The polling points in time of monitor unit 107 by the arithmetic unit may be flexible due to the inclusion of the arithmetic unit and may adapt to the instantaneous conditions of the application. This is advantageous compared to the use of an external watchdog having fixed polling times.

If in the first exemplary embodiment a comparison of the time stamp difference value in multi-channel sequencer 109 also takes place for a minimum (minimum time duration of the input signal), it may also be additionally checked whether the time base is active and did not stop at a fixed value. This may be provided as a separate step in the program sequence in addition to checking for the maximum, if only a maximum is checked for. If the comparison is errorless (e.g., the maximum value is not exceeded), it may be additionally checked in one preferred embodiment whether the signal duration is >0. In this way, a possibly not continuing time base may be recognized and may, in turn, be reported via an error signal.

Due to these embodiments of the present invention, it is thus possible to include the external arithmetic unit into the check of the signal comparison or into the signal check, and implicitly into the further check of the GTM, e.g., the activity of the time base. The arithmetic unit has its own time base which is usually monitored by an additional watchdog; it thus remains capable of acting even in the event of an erroneous time base of the timer module.

To additionally check the signal activity at the corresponding channel of input module 116, it is possible to additionally use a timeout detection unit (TDU) which is present anyway in input module 116. This unit reports an interrupt to the arithmetic unit if there has been no change at the signal input within a preset time period.

Figure 3:
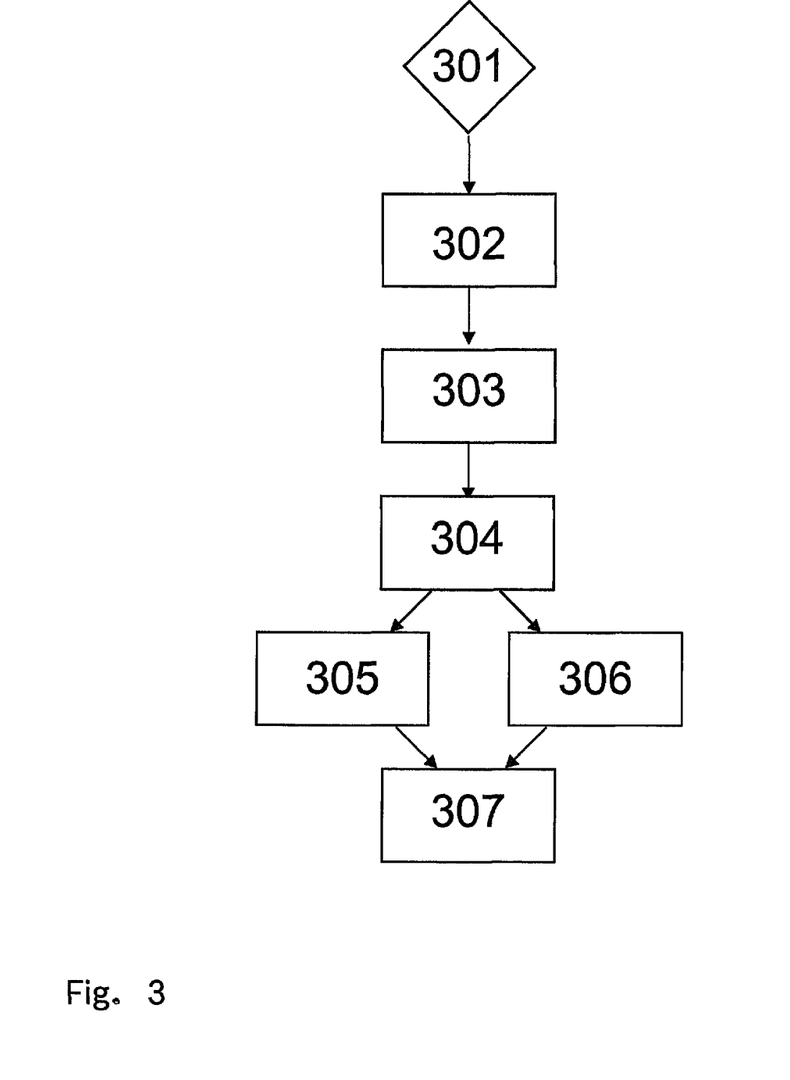
FIG. 3 shows a method for checking an output signal of a hardware data processing unit.

FIG. 3 shows an exemplary method for checking an output signal of a hardware data processing unit.

In a first step 301, an output signal to be checked is also read in again into the HW DP unit from a hardware data processing unit (HW DP unit) in addition to being output via an output module of the HW DP unit (e.g., output module 113 or 114 in FIG. 1). The HW DP unit is in particular a timer module (e.g., timer module 100 from FIG. 1), preferably as a part of an or in cooperation with an automotive control unit. The signal, which is read in again, is read in into an input module of the HW DP unit (e.g., input module 116 in FIG. 1).

In a second step 302, signal characteristics of the signal, which were read in again, as described above with regard to the figure for input module 116 or in the exemplary embodiments, are determined and assigned thereto.

In the subsequent step 303, the signal characteristics are read and stored by a logic module of the HW DP unit (e.g., programmable logic modules 109 and 200 in FIGS. 1 and 2, respectively) via a routing module of the HW DP unit, for example (e.g., routing unit 101 in FIG. 1).

The read and stored information regarding the signal to be checked is processed by the logic module in step 304 (e.g., difference formation of the time stamps of the first and the second flanks of the input signal) and is compared to the values stored in the HW DP unit, in particular in the logic module. For this purpose, the comparison may be carried out, for example, using maximum and/or minimum values, also including allowed value tolerances, for example. In particular, a configuration or modification of the comparison values by the logic module and/or the external arithmetic unit may be carried out depending on the application or on the value of certain parameters due to an access to the registers of the logic module in which the comparison values are stored.

If the comparison in step 304 is successful, the stored information or values are thus, depending on the type of the comparison, within an allowed interval: below a maximum value, above a minimum value, or they exactly correspond to a predefined value; step 305 consequently follows in the method. If, however, the comparison is not successful, i.e., does not meet a preset comparison requirement, the method branches to step 306.

In step 305, depending on the embodiment of the method, it is, for example, possible that no further action takes place since an admissible comparison does not necessarily require an action. In this case, the method possibly jumps back to method start 301 via a step 307 (end of the method) without additional measures. Alternatively, other actions may also be provided, in particular that an interrupt is sent to the arithmetic unit, as described above, even in the event of a successful comparison and/or a notification or information is sent to another module of the HW DP unit (e.g., monitor module 107 in FIG. 1) or is stored there. After carrying out or initiating the provided measures in the event of a successful comparison, the method possibly jumps back to method start 301 via a step 307 (end of the method).

In step 306, in the event of an unsuccessful comparison, the measures to be resulting therefrom are taken, i.e., initiated. For this purpose, an interrupt of an arithmetic unit may be provided, for example, and a notification or information regarding the unsuccessful comparison may be sent to another module of the HW DP unit (e.g., monitor module 107 in FIG. 1) or be stored there. Depending on the error, the method may be completed with step 306 or may possibly jump back again to method start 301 via step 307 (end of the method) after the completion or initiation of the measures in the event of an error.

What is claimed is:

1. A timer module of a control unit, comprising:
   at least one output module;
   at least one input module;
   at least one logic module; and
   a routing unit to interconnect the modules;
   wherein an output signal to be checked is read in to the input module, wherein the output signal to be checked includes an output signal of the output module,
   wherein the signal characteristics for the output signal to be checked are determined in the input module,
   wherein the logic module reads the signal characteristics from the input module,
   wherein the logic module compares the signal characteristics to at least one comparison value, a signal length of the output signal being compared as the signal characteristics, in that in the input module time stamp values are assigned to the signal flanks of the output signal and a difference of the time stamp values is compared to a permissible maximum value,
   wherein the routing unit interconnects the modules and, which due to blocking requesting and transmitting of data, provides interrupt functionality without a separate interrupt controller, and
   wherein the routing unit enables each of the modules, which are connected to the routing unit, to have any number of routing unit write channels, which are data sources, and any number of routing unit read channels, which are data sinks, so that the routing unit provides that any of the data sources may be connected to any of the data sinks.

2. The timer module as recited in claim 1, further comprising:
   an external arithmetic unit;
   wherein, for the comparison in the logic module, the external arithmetic unit configures the at least one comparison value.

3. The timer module as recited in claim 1, wherein a storage unit associated with the logic module is provided for storing the signal characteristics.

4. The timer module as recited in claim 1, further comprising:
at least one of (i) an error-generating unit for emitting an error signal in the case of an unsuccessful comparison, and (ii) an interrupt unit for initiating an interrupt of an arithmetic unit to which the time module is connected.

5. The timer module as recited in claim 1, further comprising:
means for generating an activity signal when the comparison is carried out.

6. The timer module as recited in claim 1, wherein the logic module checks whether the difference of the time stamp values is greater than zero.

7. The timer module as recited in claim 1, wherein the input module is configured to filter and receive input signals of the timer module, wherein different characteristics of the input signals are measured within channels of the input module, wherein the signals are linked to time information and physical information in the input module and are used in the output module to generate output signals.

8. The timer module as recited in claim 7, wherein the physical information includes at least one of an angle of an engine, a mass, a temperature, a level of a fluid, a phase of an oscillation, a number of events or edges, and a period duration of a signal.

9. The timer module as recited in claim 7, wherein the input includes time stamp values of detected rising or falling input flanks combined with a new signal level or a number of the flanks, a channel release being combined with the instantaneous time stamp or a PWM signal length for an entire PWM period.

10. The timer module as recited in claim 7, wherein the values which are assigned to the input signal, including the value of the time base, characterize the input signal and allow for calculations in other ones of the modules which are connected to the routing unit, so that the output module outputs signals which are generated as a function of the transmitted values in connection with at least one of an instantaneous time value and an angle base value.

11. A method for checking an output signal of a timer module of a control unit, the timer module having at least one output module, at least one input module, and at least one logic module, the method comprising:
reading into the input module the output signal to be checked, wherein the output signal to be checked includes an output signal of the output module;
determining in the input module the signal characteristics for the output signal to be checked;
reading by the logic module the signal characteristics from the input module; and
comparing in the logic module the signal characteristics for the output signal to at least one comparison value, a signal length of the output signal being compared as the signal characteristics, in that in the input module time stamp values are assigned to the signal flanks of the output signal and a difference of the time stamp values is compared to a permissible maximum value;
wherein the timer module includes a routing unit to interconnect the modules,
wherein the routing unit interconnects the modules and, which due to blocking requesting and transmitting of data, provides interrupt functionality without a separate interrupt controller, and
wherein the routing unit enables each of the modules, which are connected to the routing unit, to have any number of routing unit write channels, which are data sources, and any number of routing unit read channels, which are data sinks, so that the routing unit provides that any of the data sources may be connected to any of the data sinks.

12. The method as recited in claim 11, wherein one of an external arithmetic unit or the logic module configures the at least one comparison value for the comparison.

13. The method as recited in claim 12, wherein the logic module reads in the signal characteristics from the input module via the routing unit.

14. The method as recited in claim 13, wherein the signal characteristics are stored in the logic module.

15. The method as recited in claim 11, further comprising:
at least one of (i) emitting an error signal in the case of an unsuccessful comparison, and (ii) initiating, in the case of an unsuccessful comparison, an interrupt of an arithmetic unit to which the time module is connected.

16. The method as recited in claim 11, further comprising:
generating an activity signal when the comparison is carried out.

17. The method as recited in claim 11, wherein, in the comparison, the logic module checks whether a difference of the time stamp values is greater than zero.

18. The method as recited in claim 11, wherein the input module is configured to filter and receive input signals of the timer module, wherein different characteristics of the input signals are measured within channels of the input module, wherein the signals are linked to time information and physical information in the input module and are used in the output module to generate output signals.

19. The method as recited in claim 18, wherein the physical information includes at least one of an angle of an engine, a mass, a temperature, a level of a fluid, a phase of an oscillation, a number of events or edges, and a period duration of a signal.

20. The method as recited in claim 18, wherein the input includes time stamp values of detected rising or falling input flanks combined with a new signal level or a number of the flanks, a channel release being combined with the instantaneous time stamp or a PWM signal length for an entire PWM period.

21. The method as recited in claim 18, wherein the values which are assigned to the input signal, including the value of the time base, characterize the input signal and allow for calculations in other ones of the modules which are connected to the routing unit, so that the output module outputs signals which are generated as a function of the transmitted values in connection with at least one of an instantaneous time value and an angle base value.

* * * * *